June 7, 1927.
A. I. S. HALVORSEN
1,631,725
RACK FOR TEA, COFFEE, AND SPICE CONTAINERS
Filed June 14, 1926     2 Sheets-Sheet 1
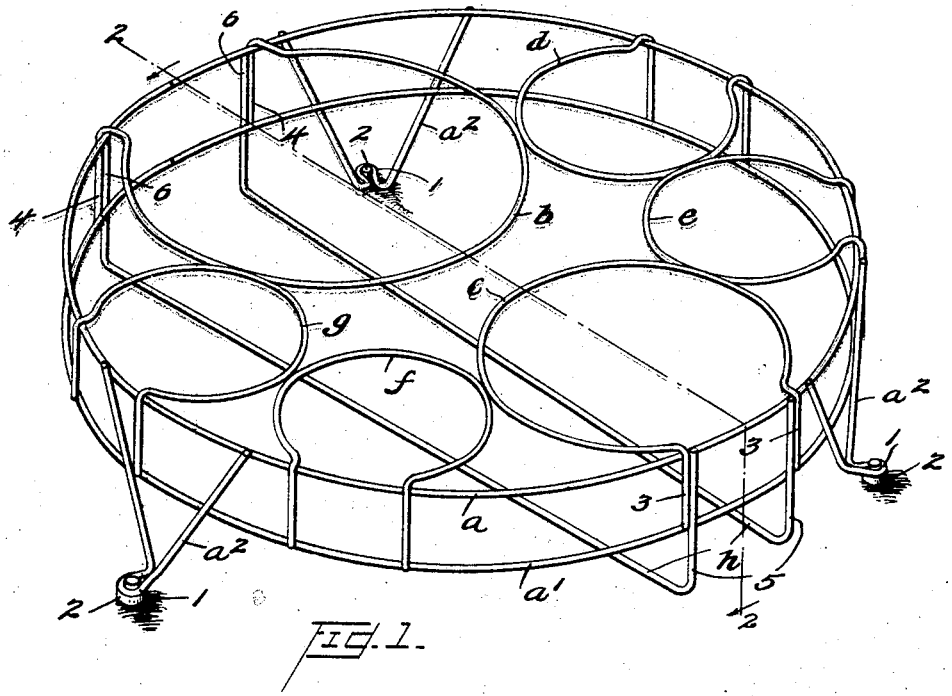
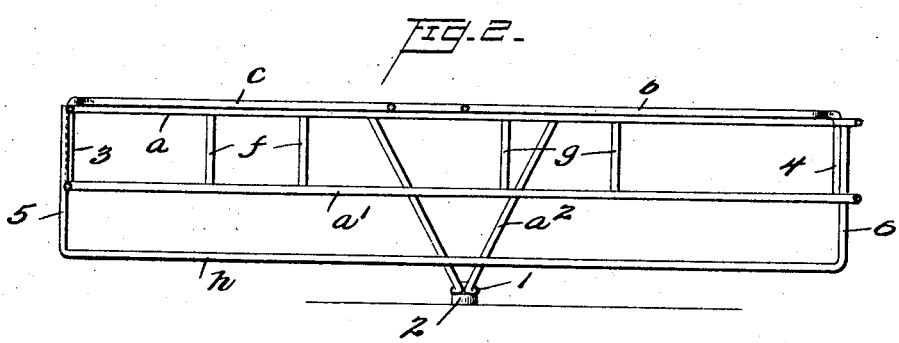
Inventor
Axel I. S. Halvorsen
By Robert Watson
Attorney June 7, 1927.
A. I. S. HALVORSEN
1,631,725
RACK FOR TEA, COFFEE, AND SPICE CONTAINERS
Filed June 14, 1926  2 Sheets-Sheet 2
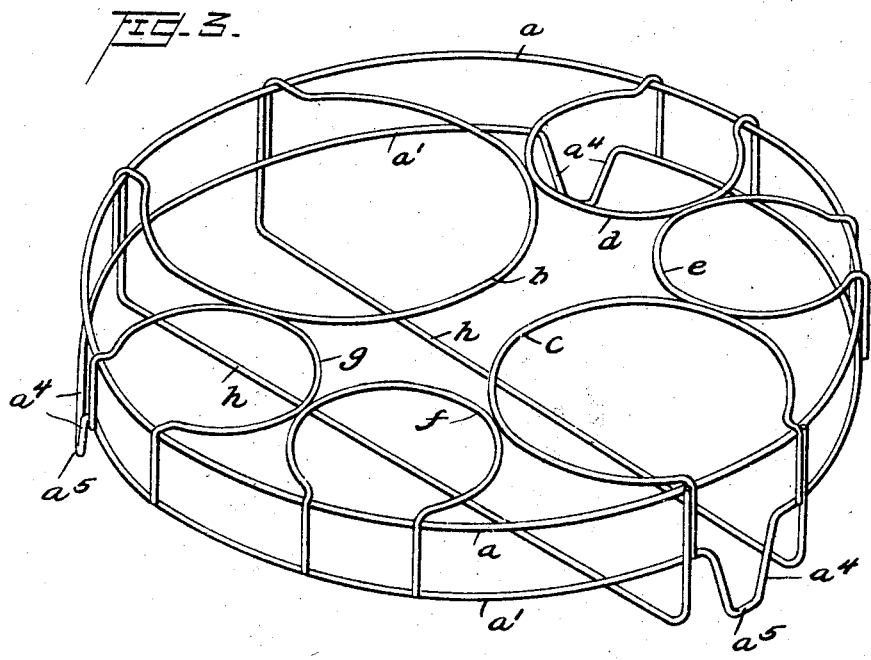
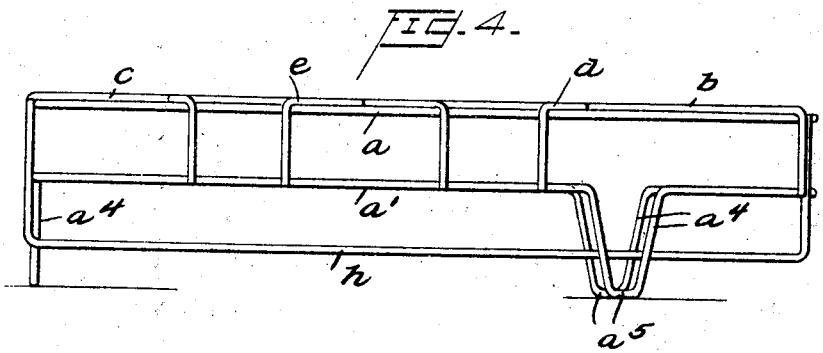
Inventor
Axel I. S. Halvorsen
By Robert Watson
Attorney Patented June 7, 1927.

1,631,725

UNITED STATES PATENT OFFICE.

AXEL I. S. HALVORSEN, OF ALBANY, INDIANA, ASSIGNOR TO McCORMICK BROTHERS COMPANY, OF ALBANY, INDIANA, A CORPORATION OF INDIANA.

RACK FOR TEA, COFFEE, AND SPICE CONTAINERS.

Application filed June 14, 1926. Serial No. 115,912.

This invention relates to racks, such as are used in kitchen cabinets for holding small jars and containers for salt, spices, and the like, the rack of the present invention being also constructed to hold containers for tea and coffee.

The spice jars or containers are usually provided with annular ribs by which they may be supported in a rack, but the more bulky materials, such as tea and coffee, are generally kept in containers which are not supported in racks and which are not provided with ribs whereby they may be supported.

In the present invention, the rack frame is of circular form and a plurality of wire loops are secured to the frame, and these loops extend inwardly toward the center of the frame, in one common plane. Some of these loops are of relatively small sizes, adapted to support spice jars and the like, and two of the loops are of relatively large size, one being larger than the other, and adapted to receive coffee and tea containers. As these latter containers are not usually provided with ribs, whereby they may be supported on the loops, I provide one or more supporting bars extending below the larger loops by which the coffee and tea containers will be supported out of engagement with the floor or surfaces upon which the rack is supported. These supporting members may, however, be omitted providing the tea and coffee containers are constructed with annular ribs to rest upon the loops. The relatively large loops are secured to the opposite sides of the frame and project inwardly toward the center, and the relatively small loops are arranged at the sides of the larger loops. The arrangement of all of the loops within the area of the circular frame makes a compact and attractive looking rack well adapted for use in kitchen cabinets. The rack frame is provided with legs for supporting the rack above the floor surface of the cabinet, and in one form of the invention these legs are made separately from the rack frame and attached to it, and in another form the legs are integral with the frame.

In the accompanying drawing,

Fig. 1 is a top perspective view of a rack having supporting feet or legs made separately from the frame and attached to it;

Fig. 2 is a vertical central section through the same, taken about on the line 2—2 of Fig. 1;

Fig. 3 is a top perspective view of a rack having feet integral with the rack frame; and, Fig. 4 is a side elevation of the same, looking from right to left in Fig. 3.

The rack shown in Figs. 1 and 2 comprises a frame composed of a pair of wire rings $a$, $a'$, of substantially equal diameter, and connected together by wire supporting legs $a^2$, equally spaced apart about the rings and welded to the rings. This rack is provided with three V-shaped legs, welded to the rings and spacing the latter apart, each leg having a loop 1 at its center which is turned outwardly at right angles to the leg, forming feet. Preferably, buttons 2, of rubber, fiber, or other material, which will not scratch painted surfaces, are secured within the loops to prevent direct contact of the latter with said surfaces.

Secured to the opposite sides of the frame and projecting inwardly toward the center of the frame are two relatively large wire loops of circular form, $b$ and $c$, the former being larger in diameter than the latter, and at the sides of these large loops are a plurality of relatively small loops, $d$, $e$, $f$, and $g$. These various loops are all of the same form and similarly connected to the frame rings, $a$, $a'$. Thus, the loop $c$ has end portions 3 which are bent over at right angles to the plane of the loop, and these end portions extend over the ring $a$ and thence downward to the ring $a'$, and these end portions are welded to the rings. The loop $b$ has end portions 4, bent at right angles to the plane of the loop and extending over the upper ring and welded to both of the rings. The end portions of the smaller loops are likewise connected to the rings, as will be evident from an inspection of the drawing, These various loops all lie in the same horizontal plane. The relatively small loops are adapted to support jars or containers for spices, salt, etc., which containers are provided with annular ribs which rest upon the loops. Containers for coffee and tea are usually much larger than the containers for spices and these larger containers are usually not provided with annular ribs. The loop $c$ is adapted to receive a container for tea and the loop $b$ is adapted to receive a container for coffee. As coffee canisters or containers are usually more bulky than tea containers, the loop $b$ is made considerably larger than the loop $c$. In order to support the tea and coffee containers, I provide a pair of supporting wires $h$, having their end portions 5 and 6 bent at right angles to the body portions and welded to the rings $a$ $a'$. These supporting wires extend across the frame below the larger loops and the tea or coffee canisters or containers are supported by the wires $h$ out of the contact with the floor or surface on which the rack rests, so that these containers cannot scratch the surface when the rack is moved. Should the coffee and tea containers be made with annular ribs to rest upon the loops $b$ and $c$, the supporting wires $h$ may be omitted.

In Figs. 2 and 3 of the drawing, the rack is the same as in the previously described figures, except that the legs, instead of being made separately from the frame and attached to it, are made integral with the lower ring of the frame. Thus, the lower ring $a'$, in Fig. 3, has three equally spaced parts bent sharply downward into U-form, forming supporting legs $a^4$, the bottom portions $a^5$ of the feet being parallel with the ring and of sufficient length to provide a suitable bearing surface.

The rack shown in Figs. 3 and 4 is somewhat less expensive to manufacture than the one shown in Figs. 1 and 2, because the lower ring and legs are in one piece.

What I claim is:

A rack for condiment jars and other containers comprising a frame composed of a pair of concentric wire rings spaced apart and having feet for supporting the frame horizontally, two relatively large arcuate wire loops projecting inwardly from opposite sides of the upper ring, a plurality of relatively small wire loops projecting inwardly from the upper ring at the sides of the large loops, the ends of said loops being bent downwardly and connected to both rings, and supporting wires extending across the lower side of the frame, under said relatively large loops and having their ends bent upwardly and secured to both of said rings.

In testimony whereof I hereunto affix my signature.

AXEL I. S. HALVORSEN.